[11] 3,597,684

| | | |
|---|---|---|
| [72] | Inventor | Weli H. J. Damen<br>Tampere, Finland |
| [21] | Appl. No. | 798,068 |
| [22] | Filed | Feb. 10, 1969 |
| [45] | Patented | Aug. 3, 1971 |
| [73] | Assignee | Oy Nokia ab<br>Helsinki, Finland |
| [32] | Priority | Feb. 12, 1968 |
| [33] | | Finland |
| [31] | | 363/68 |

[54] OPTICALS METHOD UTILIZING LIGHT MODULATION FOR THE TRANSFER OF INFORMATION FROM ONE POTENTIAL LEVEL TO ANOTHER AND DEVICE FOR THE APPLICATION OF THIS METHOD
7 Claims, 3 Drawing Figs.

[52] U.S. Cl. ............................................. 324/96,
250/199, 340/189
[51] Int. Cl. ............................................. H04b 9/00
[50] Field of Search............................................. 324/96;
250/199; 340/189

[56] References Cited
UNITED STATES PATENTS

| | | | |
|---|---|---|---|
| 3,346,811 | 10/1967 | Perry et al. ................... | 324/96 |
| 3,363,174 | 1/1968 | Hudson et al. ................ | 324/96 |
| 3,411,069 | 11/1968 | Kubler et al. ................. | 324/96 X |
| 3,461,384 | 8/1969 | Bayati et al. ................. | 324/96 |
| 3,485,940 | 12/1969 | Perry et al. .................. | 324/96 X |
| 3,492,574 | 1/1970 | Heintz et al................... | 324/96 |

*Primary Examiner*—Gerard R. Strecker
*Attorney*—Stevens, Davis, Miller and Mosher ABSTRACT: A method for transferring information optically by means of light, which is time division modulated, in such a way that pulse groups, which are time separated and contain a set number of pulses, are generated at ground potential, converted from series to parallel form, and have information added thereto by selectively removing and leaving pulses in the groups. A subsequent parallel-to-series conversion is effected and the resulting pulse groups are transferred by a light emitting means through an insulating means to light sensitive means where the series of pulses is again converted to parallel form and directed to the appropriate indicating circuit.

OPTICALS METHOD UTILIZING LIGHT MODULATION FOR THE TRANSFER OF INFORMATION FROM ONE POTENTIAL LEVEL TO ANOTHER AND DEVICE FOR THE APPLICATION OF THIS METHOD

The present invention relates to a method for the transfer of information from one potential level to another and device for the application of this method.

The object of this invention is to provide a method for the transfer of information from one potential level to another, e.g. from ground potential to the protection devices of a series capacitor bank and vice versa. Another object of the invention is to provide a device for the application of this method.

Previously the transfer of information between ground potential and the protective devices on a platform for a series capacitor bank has been arranged e.g. by means of insulating bars transmitting mechanical movement. Such bars have, however, the disadvantages of slowness in information transfer, a great demand for power, difficulty in increasing the amount of information transferred, and high wear of the mechanical parts.

Attempts have been made to transmit the mechanical movements hydraulically or pneumatically. Those devices are hampered by the disadvantages mentioned above.

Optical arrangements have also been tried where the light emitted from an incandescent lamp is led through lenses from ground potential to the platform under tension where a mirror reflects the beam back to a light sensitive means at ground potential. A mechanically operated flap located on the platform is then able, after receiving guidance, to cut the light beam and the light sensitive means at ground potential is arranged to sense the change in the light intensity. This arrangement is able to transmit one "on-off" information from the platform potential to the ground potential. In case one wants to increase the amount of information, the number of the described systems must be increased correspondingly. When the number of channels is increased, this brings about a certain additional disadvantage on account of the difficulty of directing the light beam in such a way that interference with other channels is avoided. Even with this arrangement the transmission of information is slow and an additional disadvantage is the wear of the mechanical parts.

The object of this invention is to obviate these disadvantages and attain a particularly rapid transmission of information.

The method according to the invention is therefore mainly characterized in that the information is transferred optically by means of light, modulated according to the time division principle, in such a way that impulse groups, separated from each other in regard to time and containing a certain number of impulses each, are generated using e.g. an oscillator at ground potential, which impulses are converted from series form to parallel form, and thereafter the "on-off" information is added to the impulses by removing or leaving the impulse in question. A conversion from parallel form into series form is carried out and the resulting impulse groups are transferred by means of a light emitting means through an insulating medium to e.g. a platform under tension, where the light impulse groups are indicated by means of a light sensitive means, whereby the impulse groups in series form are converted into parallel form and directed each to its own indicated circuit which indicates the information carried by the impulse.

The following advantages, amongst others, are obtained by means of the invention:

The capacity of information transfer is easily enlarged.
The speed of information transfer is easily increased.
The power demand is low.
The information transfer can easily be made double directed, as will be described later in the description of the system.

Directing difficulties do not appear because only one optical channel is used for the transfer.

The arrangement is easily protected against mechanical and climatic disturbances.

The arrangement does not have mechanically movable parts.

The means for accomplishing the foregoing objects, and other advantages which will be apparent to those skilled in the art, are set forth in the following specification and claims and are illustrated in the accompanying drawings dealing with a basic embodiment of the present invention. Reference is made now to the drawings in which:

Figure 1:
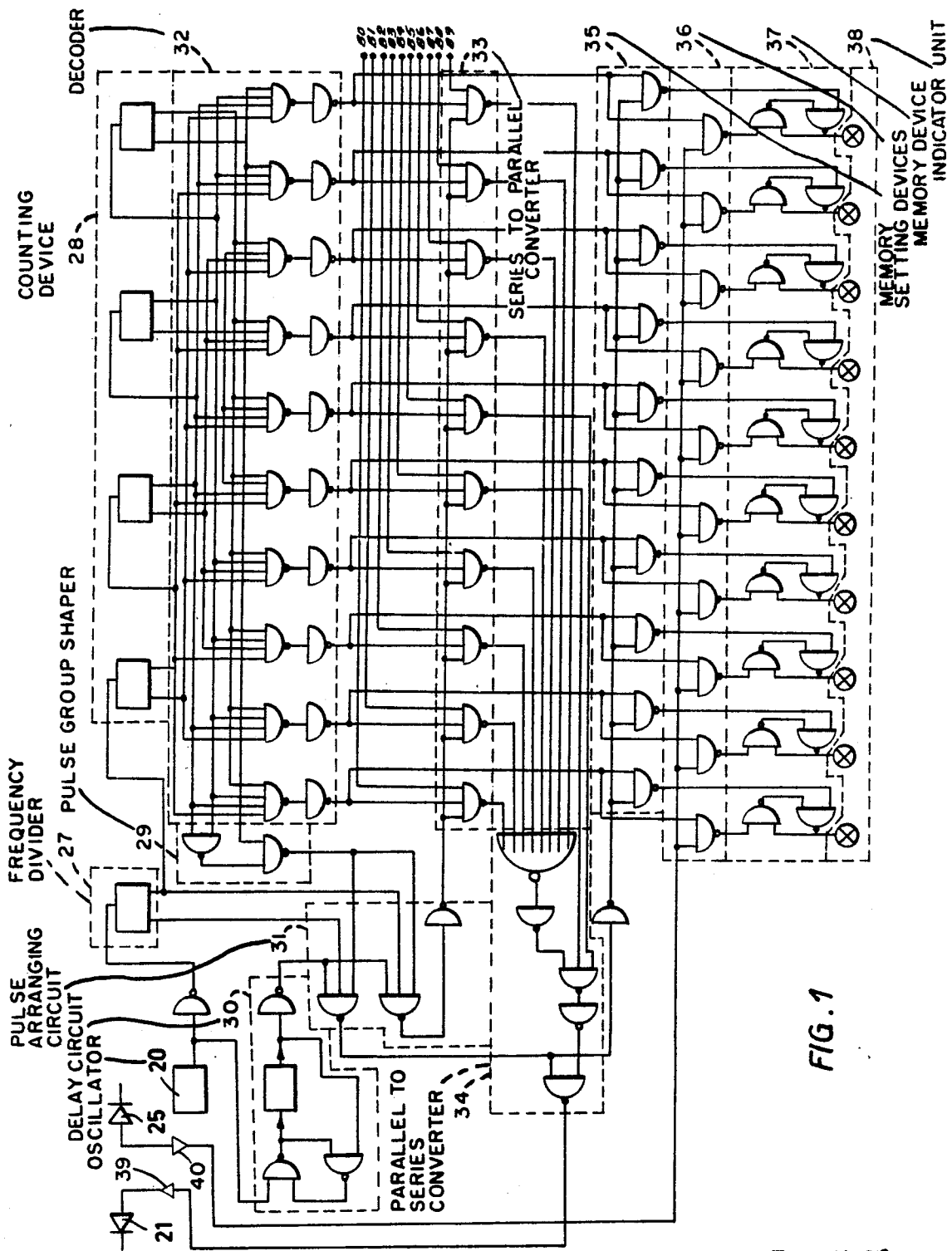
FIG. 1 shows schematically the coupling arrangement of an information transfer system at ground potential with 10 channels according to the invention.

A double directed optical information transfer is accomplished by modulation of the light emitted from e.g. a light diode, the light having a wave length of about 9,000 A. and emitted according to the so called time division principle in such a way that the light diode 21 at ground potential transmits light impulse groups comprising $2N$ impulses ($N$ denotes the number of information bits to be transmitted). The pulse groups are formed with every other pulse separated to form a synchronization pulse and the remaining pulses forming information pulses. This is performed in the pulse arranging circuit 31 of FIG. 1 in such a way that the basic pulse train from oscillator 20 feeds a frequency dividing circuit 27 and a frequency dividing the delay circuit 30.

The frequency dividing circuit 27 simultaneously opens two gates in the pulse arranging circuit 31, and the slightly delayed pulses derived from circuit 30 are thus arranged in such a way that every other pulse is led directly to a parallel-to-series converter 34. Those pulses are called sync pulses. The other pulses are led to a series-to-parallel converter 33 and are called information pulses.

The series-to-parallel converter 33 operates in such a way that the pulses derived from the frequency dividing circuit 27 feed a counting device 28. The outputs of the counting device 28 are connected to a decoder circuit 32 and the decoder outputs simultaneously open the gates in the series-to-parallel converter 33.

The information pulses derived from the pulse arranging circuit 31, which are in a series configuration, are fed to all these gates and one certain pulse is thus present at the output of the gate determined by the output of the decoder 32. The information pulses are now converted from series-to-parallel mode. The "on-off" information $B_0$ to $B_9$ (FIG. 1) is added to the information pulses in the series-to-parallel converter 33. This is done by closing or leaving open the proper gate in the converter by applying or not applying blocking information to the corresponding terminal $B_0$ to $B_9$. If the blocking information is applied to one of the inputs $B_0$ to $B_9$, no pulse will appear at the output of the corresponding gate. The information pulses are then converted back to series mode in the parallel-to-series converter 34. The information pulses in the parallel mode are simply stored in a gate. The sync pulses from the pulse arranging circuit 31 are also stored with the information pulses, and from the output of the parallel-to-series converter 34 a pulse train is received which consists of, in this case, 20 pulses of which every other pulse, i.e. the odd pulses Nos. 1, 3, 5..., and 19 are the sync pulses and every other pulse, i.e. the even pulses Nos. 2, 4, 6..., and 20 are the information pulses. The pulse groups of 20 pulses are formed in a pulse group shaper 29. The pulse group shaper 29 blocks the pulse arranging circuit 31 every second time the counting device 28 is full.

The sync pulses derived from the pulse arranging circuit 31 are also led to a setting unit 35 for a memory device 37. The memory device 37 is set by the information pulse through the setting device 35.

Figure 2:
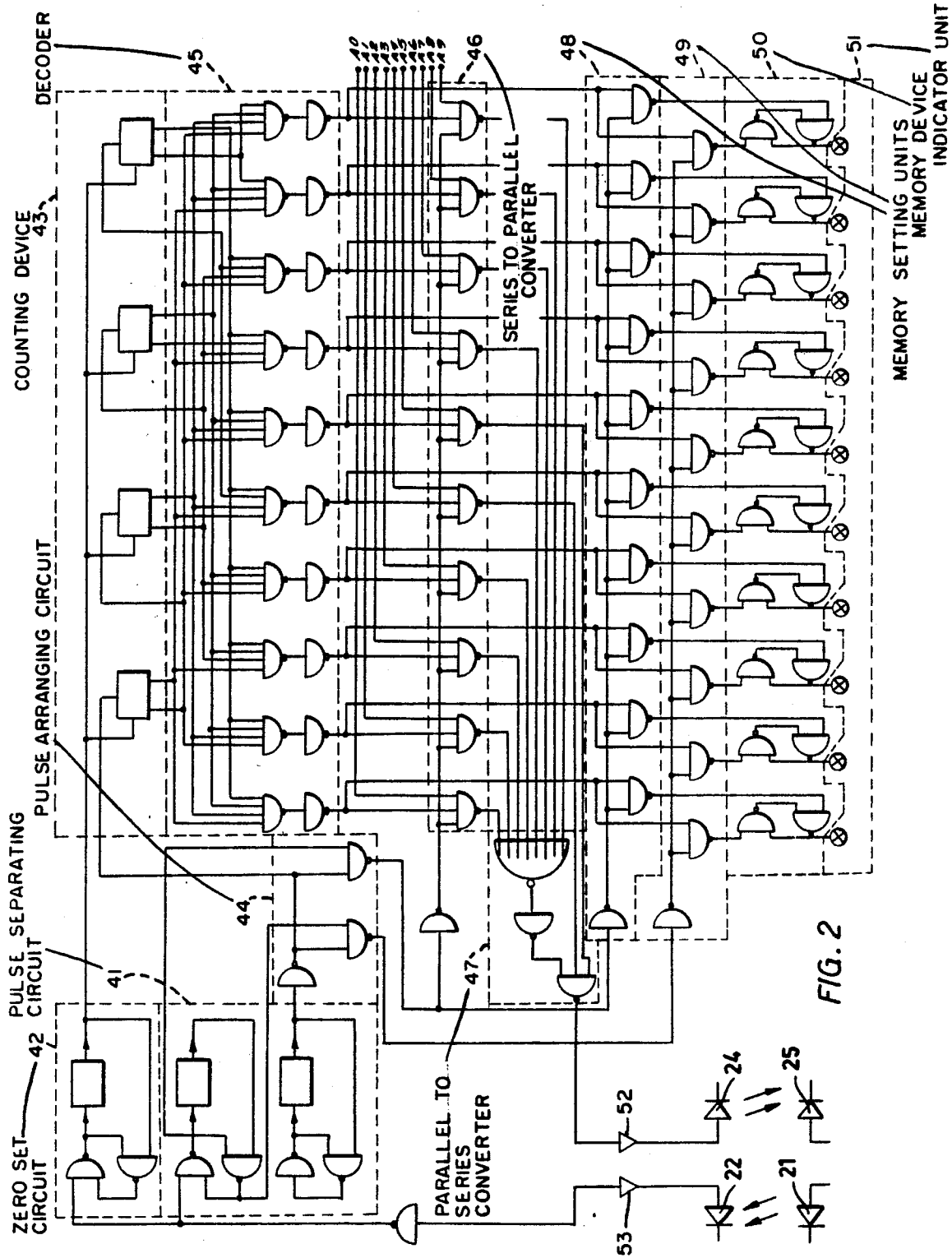
FIG. 2 shows schematically the coupling arrangement of an information transfer system with 10 channels according to the invention and being at the potential of the platform.
Figure 3:
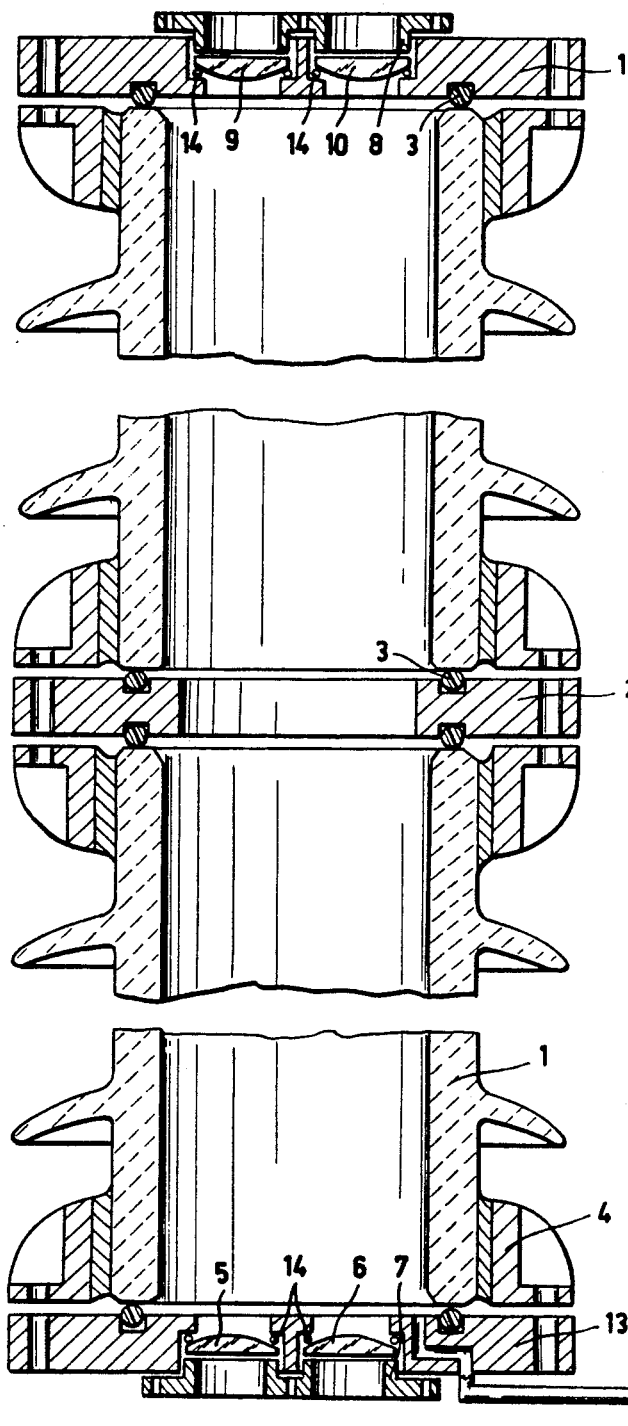
FIG. 3 shows, in section, a hollow insulator for optical transfer.

The pulse train derived from the parallel-to-series converter 34 is amplified in an amplifier 39. The amplified electrical pulse is then converted into a light pulse train by means of a light emitting diode 21 at ground level. The light pulse train is transferred through an optical channel comprising a porcelain insulator 1 (FIG. 3) to the platform under tension when the pulse train is received by a light sensitive diode 22. The light emitting diode 22 (FIG. 2) converts the light pulse train into an electrical pulse train. The receiving amplifier 53 then amplifies the pulse train. The pulse train is led to a pulse separating circuit 41 and to a zero-setting circuit 42. Said pulse separating circuit and the pulse arranging circuit 44 separate the sync pulses from the information pulses and arrange them into two different pulse trains. The sync pulse train is led to a counting device 43 and to a series-to-parallel converter 46. A decoder 45 controls the series-to-parallel converter and enables one of the sync pulses at a time to pass through its gate. The gates in the series-to-parallel converter 46 could be permanently shut by applying a blocking signal to the inputs $A_0$ to $A_9$. The zero-setting circuit zero-sets the counting device 43 when the pulse group is finished. Furthermore, the sync pulse train sets the memory device 50 through the memory device setting unit 48. The separated information pulse train resets the memory device setting unit 49 if the information pulse in question is present. Otherwise the indicator unit 51 indicates which information pulse is missing. In this way 10 "on-off" information bits $B_0$ to $B_9$ have been transmitted from ground level to the platform having a different potential.

The 10 information bits $A_0$ to $A_9$ are transmitted from the platform level to ground level in the following way: The sync pulse train has passed the series-to-parallel converter 46 and the pulses are in parallel mode. The information bits $A_0$ to $A_9$ have been added to the pulses in the series-to-parallel converter 46. After a parallel-to-series conversion in the parallel-to-series converter 47, the pulse train is amplified in the transmitting amplifier 52, and the electrical pulse train is then led through the light emitting diode situated on the platform, which converts the electrical pulse train into a light pulse train. The light sensitive diode 25 at ground potential receives the light pulse train and converts it back to its electrical mode. After amplification in the receiving amplifier 40 (FIG. 1), the electrical pulse train is led to the unit 36 for resetting the memory device 37. The memory device 37 has been set by the sync pulses derived from the pulse arranging circuit through the setting device 35. A missing resetting pulse will be indicated by the indicating unit 38. In this way 10 pieces of "on-off" information are sent from the potential level of the platform to ground level.

The actual optical transfer according to the embodiment described takes place in the hollow porcelain insulator 1 such that outside disturbances as dirt, rain, snow, or birds are not able to disturb the information transfer.

The space inside the porcelain insulator must be exceptionally dry. Humidity would obviously decrease the insulation level and cause the lenses 5, 6, 9, 10 located in the ends of the insulator to be covered with frost at low temperature. On account of this, the insulator column is made as hermetic as possible and filled with particularly dry nitrogen under a suitably high pressure. A high pressure per se does not prevent humidity from entering the column because the partial pressures of vapor strive towards equalization independently of a counter pressure. Due to this, the constructional parts as f.i. packings should be of best possible nonhygroscopic material. The additional pressure, however, prevents the column from breathing in accordance with temperature changes. Thus the additional pressure stability is of importance even from maintenance point of view.

The top and bottom parts 12, 13 of the insulator 1 are provided with grooves for the 0-type sealing rings 3. Each of the O-rings is pressed against the smooth ground end surface of the porcelain part. The top and bottom parts 12, 13 further carry the lenses 6, 7 and 9, 10 respectively, which by the lens retainers 7, 8 are pressed against the 0-type sealing rings 14. In the joint between the main porcelain parts there is an intermediate part 2 inserted and provided on both sides with O-type sealing rings 3.

The electrical circuits are protected from disturbances by placing the sensitive receiver and the power amplifier 20 controlling the light diode in the ends of the insulator 1 in closed metallic protecting housings. The impulse sequences are led from the protecting devices through a particularly well protected coaxial cable to a relay box located together with other protecting devices on the platform and, at ground potential, to a control box in a protective construction, where the series-parallel-series converters consisting of integrated circuits are situated.

What I claim is:

1. A method for the transfer of information from one potential level to another, e.g. from ground potential to the protection devices of a series capacitor bank, and vice versa, comprising the steps of:

a. generating at a first potential level pulse trains separated from each other in regard to time and containing $2N$ pulses each;

b. separating from said pulse trains every other pulse (1, 3, 5, ...$2N-1$) to form synchronizing pulse trains and every other pulse (2, 4, 6, ...$2N$) to form information pulse trains;

c. converting said information pulse trains into parallel form;

d. adding information to the signal by selectively removing pulses;

e. converting said pulses into series mode;

f. combining the information pulse trains and synchronizing pulse trains into original pulse trains (1, 2, 3, ...$2N$) in which the even numbered positions (2, 4, 6, ...$2N$) may be left out depending on the information;

g. transferring the information from said first potential level to said other potential level optically by means of light, modulated according to the time division principle;

h. indicating the presence of light pulse trains;

i. separating every other of the pulse trains, i.e. the pulse position trains (2, 4, 6, ...$2N$) carrying information;

j. converting said last mentioned pulse trains into parallel mode;

k. directing each of said pulse trains to a corresponding indicating circuit for indicating the information of the pulse position;

l. separating every other, odd numbered pulse (1, 3, 5, ...$2N-1$) in the train received.

m. converting said odd numbered pulses into parallel mode;

n. adding to said odd numbered pulses the information to be transmitted in the opposite direction by selectively removing pulses;

o. converting said odd numbered pulses into series mode;

p. transmitting the resulting new information pulse train back to the first potential level;

q. converting said pulses into electrical pulse trains.

r. converting the pulse positions of said electrical pulse trains from series mode into parallel mode;

s. directing each of said pulse positions to its own indicating circuit which indicates the information carried by the pulse.

2. A device for the transfer of information from one potential level to another, e.g. from ground potential to the protection devices of a series capacitor bank, and vice versa, comprising:

a. means for generating at a first potential level pulse trains separated from each other in regard to time and containing $2N$ pulses each;

b. a frequency dividing circuit separating every other pulse (1, 3, 5, ...$2N-1$) from said pulse trains to form synchronizing pulse trains and every remaining pulse (2, 4, 6, ...$2N$) to form information pulse trains;

c. a first series-to-parallel converter converting said information pulse trains into parallel form;

d. means for adding information to the signal by selectively removing a pulse;

e. a first parallel-to-series converter converting said pulses into series mode;

f. means for combining the information pulse trains and synchronizing pulse trains into original pulse trains (1, 2, 3, ...2N) in which the even numbered positions (2, 4, 6, ...2N) may be left out depending on the information;

g. a first light emitting means passing light through an electrically but light permeable medium from said first potential level to said another potential level for transferring the information optically, modulated according to time division.

h. a first light sensitive means for indicating presence of the light pulse trains;

i. a pulse separating circuit separating the pulse trains carrying information;

j. a second series-to-parallel converter converting said last mentioned pulse trains into parallel mode;

k. means for directing each of said pulse trains to a corresponding indicating circuit indicating the information of the pulse position;

l. a pulse arranging circuit separating every other, odd numbered pulse in the train received;

m. a second series-to-parallel converter converting said odd numbered pulses into a parallel mode;

n. means for adding to said odd numbered pulses the information to be transmitted in the opposite direction by selectively removing the pulse in question;

o. a second parallel-to-series converter converting said odd numbered pulses into a series mode;

p. a second light emitting means transmitting the resulting new information pulse train through said insulating medium back to the first potential level;

q. a second light sensitive means for converting said pulses into electrical pulse trains;

r. said first series-to-parallel converter converting the pulse positions of said electrical pulse trains from series mode into parallel mode;

s. means for directing each of said pulse positions to its own indicating circuit which indicates the information carried by the pulse.

3. A device for the transfer of information from one potential level to another according to claim 2 further comprising means defining a closed space and connecting that portion of said device at one potential that the portion at another potential and permitting optical information transfer while protecting against atmospheric and mechanical disturbances.

4. A device for the transfer of information from one potential level to another according to claim 3 wherein said means defining a closed space comprises a gas filled hollow insulator.

5. A device for the transfer of information from one potential level to another according to claim 3 wherein said means defining a closed space comprises a plurality of light conductive filaments.

6. A device for the transfer of information from one potential level to another according to claim 2 wherein said light emitting means comprises a semiconductor.

7. A device for the transfer of information from one potential level to another according to claim 2 wherein said light emitting means comprises a discharge tube.